United States Patent [19]

Bücking

[11] 4,293,509

[45] Oct. 6, 1981

[54] PROCESS FOR THE PRODUCTION OF CHIPBOARDS, FIBERBOARDS, OR LIKE BOARDS

[75] Inventor: Günter Bücking, Spring, Fed. Rep. of Germany

[73] Assignee: Bison-werke Bähre & Greten GmbH & Co. KG, Spring, Fed. Rep. of Germany

[21] Appl. No.: 104,703

[22] Filed: Dec. 17, 1979

[30] Foreign Application Priority Data

Dec. 15, 1978 [DE] Fed. Rep. of Germany ....... 2854336

[51] Int. Cl.[3] ................................. B29J 5/02

[52] U.S. Cl. ................................. 264/26; 264/83; 264/120

[58] Field of Search ............... 156/60.2, 272; 264/109, 264/112, 113, 120, 122, 25, 83, 26; 162/192

[56] References Cited

U.S. PATENT DOCUMENTS

| | | | |
|---|---|---|---|
| 3,230,287 | 1/1966 | Caron et al. | 264/120 |
| 3,668,286 | 6/1972 | Brooks et al. | 162/192 |
| 3,880,975 | 4/1975 | Lundmark | 264/122 |
| 4,111,744 | 9/1978 | Reiniger | 264/120 |
| 4,216,179 | 8/1980 | Lamberts et al. | 264/25 |

FOREIGN PATENT DOCUMENTS

| | | | |
|---|---|---|---|
| 2411636 | 9/1975 | Fed. Rep. of Germany | 264/109 |

*Primary Examiner*—Michael W. Ball
*Attorney, Agent, or Firm*—Craig and Antonelli

[57] ABSTRACT

A process for the production of chipboards, fiberboards, and the like boards, from particles containing lignocellulose and/or cellulose and/or other particles which are electrically non-conductive and have a poor thermal conductivity, combined with at least one binder and water. The process includes the steps of combining the particles, binder and water, forming a layer on a moving support, preheating the layer by high frequency and thereafter pressing the layer into boards with the use of contact heat that produces a steam blast that is effective from the outside of the layer toward its inside and is characterized in that the layer is initially provided with the same amount of moisture throughout, which is sufficient to produce, by means of the high frequency preheating step, a steam blast which proceeds from the inside of the layer into the surface zone thereof.

15 Claims, 1 Drawing Figure

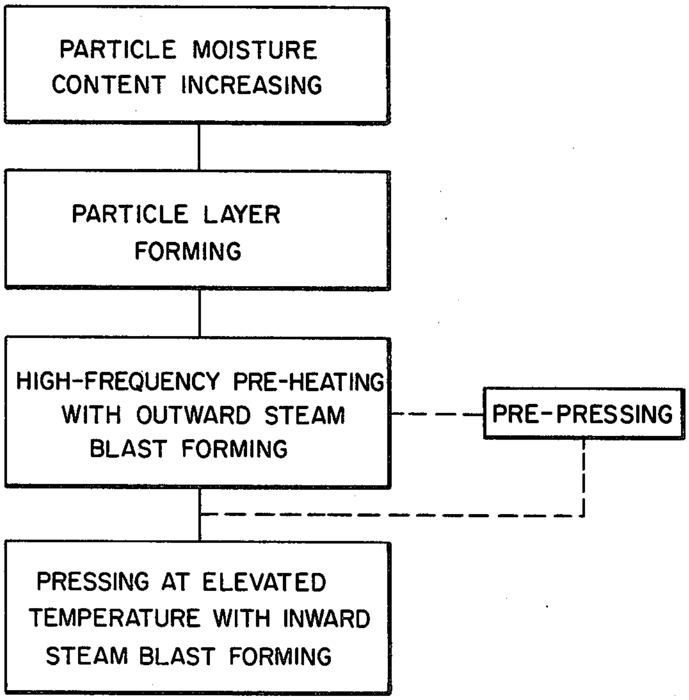
PARTICLE MOISTURE CONTENT INCREASING
PARTICLE LAYER FORMING
HIGH-FREQUENCY PRE-HEATING WITH OUTWARD STEAM BLAST FORMING
PRE-PRESSING
PRESSING AT ELEVATED TEMPERATURE WITH INWARD STEAM BLAST FORMING

PROCESS FOR THE PRODUCTION OF CHIPBOARDS, FIBERBOARDS, OR LIKE BOARDS

BACKGROUND AND SUMMARY OF THE INVENTION

The invention relates to a process for the production of chipboards, fiberboards, or like boards from particles containing lignocellulose and/or cellulose and/or from other particles which are electrically nonconductive and have a poor thermal conductivity, combined with at least one binder and with water, from which a chip layer or like layer is formed on a movable support, this layer being fed to at least one high-frequency preheating zone and thereafter being compressed into boards or panels with the use of contact heat by means of a steam blast that acts from the outside toward the inside.

It is known in the manufacture of wooden chipboards that the preheating of a chip layer or mat by high frequency leads to a plasticization of the layer particles. This plasticization results, inter alia, in an improved glue utilization and, with the bulk density remaining the same, in a lowering of the glue consumption, and a shortening of the residence time of the preheated layer in the finishing press, which press can thus be equipped, starting with a board thickness of 20 mm., initially with a lower compression power ("Holz-Zentralblatt" (Central Wood Periodical) 101 (1975), 8, 84).

According to a further known process, a further reduction in the pressing time can be attained by maintaining the surfaces or cover strata of the layer in a moister condition than the inner stratum of the layer, which latter should even be relatively dry, and by increasing the pressing temperature from about 140°-150° C. to about 180° C. This is so, because due to the difference in moisture of the layer strata and due to the increased compression temperature directly after closing of the press, steam is produced on the layer surface which from there passes, so to speak in the manner of a blast, into the less moist middle stratum so that in total, i.e. due to the high-frequency preheating step and the steam blast effect, an accelerated heating of the layer throughout is accomplished, under which condition the binder is being cured (DAS[German Published Application] 1,050,991; H. -J. Deppe and K. Ernst, "Technologie der Spanplatten" (Chipboard Technology), Stuttgart, 1964, pp. 175-177; F. Kollmann, "Holzspanwerkstoffe" (Wooden Chip Materials), Stuttgart 1977, p. 101). While the previous mode of operation involved total moisture contents of 16-18%, this moisture content was now reduced (by this further process) to about 13%, the outer strata exhibiting a moisture of 22%. The heating step, carried out in a platen press, had the effect that the boards left the press with a final moisture content of about 7-8%. The nonuniform moisture effect was achieved by spraying the surfaces of the chip cake. Thus, if the chips in the cover stratum and the chips in the middle stratum are dried for this purpose under differing conditions to varying final moisture content values, it is necessary to provide a dryer for cover stratum chips and a dryer for middle stratum chips, unless a single dryer is used to first dry the cover stratum chips and then the middle stratum chips, or to dry these chips in the reverse order. The use of two dryers does make it possible to simultaneously dry cover stratum chips and middle stratum chips, but is expensive, while the drying is time consuming.

If, in contrast thereto, the cover stratum chips and middle stratum chips are dried simultaneously in a single dryer, then the final moisture values of the middle stratum chips are higher, as experience has shown, than those of the cover stratum chips, so that such a moisture difference impairs, or can even prevent, the steam blast acting from the outside toward the inside during the finishing pressing of the layer.

It is difficult to set identical moisture values in the conventional processes for obtaining a high cover stratum moisture by spraying the lower press platens and the surfaces of the layers with water, which as surface water can be vaporized more readily and more quickly than cell-bound water. This is so, because first the lower layer stratum and thereafter the upper layer stratum makes contact with the water applied through nozzles at various points. Thereby the subsequent heating of the layer throughout becomes nonuniform, and as a consequence thereof the technological properties of the thus-manufactured boards deviate in the cover strata, which is undesirable. This disadvantage occurs to an especially marked degree if supports without sheet metal are utilized as the layer carriers, such as belts for transporting the layer and fabric belts as the press belts, for example in the form of steel mesh belts. Finally, a disadvantage of the process using very moist cover stratum chips and relatively dry middle stratum chips as the starting materials is that the cell-bound water does not evaporate as quickly as the surface water. Therefore, the steam blast effect in the press and thus the heating throughout of the layer takes place at a somewhat slower rate.

Consequently, the invention has an objective of further developing the process of the above-described type and to perfect same so that, with a minimum of expenditure a uniform, accelerated, and steam-blast-like complete heating, especially of relatively thick layers, is made possible.

This objective has been attained according to a preferred embodiment of the invention by adding to the particles to be pressed an amount of water sufficient to create a steam blast, during high-frequency preheating, that acts from the inside to the outside of the particle layer as well as for the production of an inwardly directed steam that by contact heat during finish pressing.

Thus, as contrasted to the state of the art, a characteristic of the process of the present invention is that the surfaces or cover strata of the layer are not kept moister than the layer particles of the internal stratum, before the layer passes into a high frequency heating zone; rather, care is taken that all particles are combined, prior to the formation of the layer, with a quantity of water which is sufficient so that, after producing a steam blast acting from the inside toward the outside during the high-frequency heating step, during the finishing pressing step under the effect of contact heat, a conventional steam blast acting from the outside toward the inside is still effectively produced.

BRIEF DESCRIPTION OF THE FIGURE

Additional features of the process of this invention can be seen from the following description and from the schematic illustration in the drawing, which shows steps of preferred embodiment processes.

DETAILED DESCRIPTION OF THE PREFERRED EMBODIMENTS

As can be seen with reference to the drawing, the present invention involves the steps of (1) increasing the moisture content of the particles, (2) forming the particles into an untreated layer, (3) preheating the layer by high-frequency so as to produce a steam blast that acts outwardly from the inside of the layer toward the surface zone, and (4) pressing the preheated layer at an increased temperature by application of contact heat so as to produce a steam blast that acts inwardly from the surface zone.

The total moisture content in the formed and untreated layer, which can comprise one or more strata is adjustable within wide limits, depending on the thickness of the boards to be produced. In the normal case, the total moisture content, however, is markedly higher than 12%. Especially satisfactory results are attained during the production of relatively thick boards with a moisture content of 20% in the entire layer.

Moreover, the possibility is within the scope of this invention, for example, to spray all binder-containing particles of, for example, lignocellulose and/or cellulose during their transport to the spreading device or the like with any necessary additional amounts of water. However, it is more advantageous, since it is more economical with respect to the expenditure in process technology, to adjust the binder bath so that the appropriate amount of water is added, together with or at least partially separated from the customary components of the bath, during the mixing step. If, in this connection, the time during which the water is effective on such particles is shortened, then these particles are essentially enveloped by surface water. This likewise contributes toward an accelerated heating of the layer throughout, namely during the steam blast acting in the layer from the inside toward the outside, as well as during the steam blast from the outside toward the inside.

The step of preheating the particle layer is performed by high-frequency heating. Since high frequency heat produces a temperature gradient in the layer which proceeds from a hottest value within the layer toward the surfaces of the layer, a first steam blast is created, according to the invention, that acts outwardly from the inside of the layer to its surface, and the provision of amounts of moisture (water) beyond that used heretofore for production of an inwardly directed steam blast by contact heating is important in this respect.

Additionally, the process step of creating an outwardly directed steam blast is important to the accelerated and uniform heating of the layer achieved according to this invention by passing steam up to the surface(s) of the layer during the high-frequency heating of the layer. At least part of the steam of this first steam blast is precipitated in the form of condensed water on the surface of the cover stratum chips, due to the fact that the temperature gradient in the layer proceeds from the inside toward the outside. Thus, a sufficient amount of moisture is present at that location (surface) to be able to effect, following the first steam blast, the second steam blast which acts from the outside toward the inside. Since the layer has already been extensively heated throughout during the first steam blast, it is ensured that the second steam blast, as contrasted to the prior art, does not come to a standstill before reaching the center of the layer, but rather penetrates without delay to the center of the board, even when producing relatively thick boards. The finishing pressing time is considerably reduced in this way.

Furthermore, as represented by the dashed line in the FIGURE, it is within the scope of the present invention to utilize a prepressing step. Prepressing of the layer serves to increase the thermal conductivity of the layer, thereby enabling a more rapid heating of the layer throughout to be attained.

The process of this invention can be executed in single-platen systems and in multiple-platen systems operating in a continuous or discontinuous manner, in order to manufacture single- or multiple-layer chipboards, fiberboards, and like boards for the furniture industry and the construction field. In this connection, the production of, for example, relatively thick OSB (Oriented Structural Board) panels in continuously operating single-platen devices is especially advantageous, because the thus-obtained results not only include very low thickness tolerances and great flexibility with respect to board formats, but also only comparatively minor edging and cutting losses. At the same time, a considerably high economy is achieved with this type of plant by using the process of this invention, even with binders requiring a relatively long curing time. Depending on the field of application, high-load-bearing inlaid floors, posts, moldings, and other articles can be manufactured, inter alia, from the thus-obtained boards.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. Process for the production of chipboards, fiberboards, and like boards from particles which are electrically nonconductive and have a poor thermal conductivity, comprising the steps of combining the particles with at least one binder and with water, forming a chip or like layer on a moving support, preheating said layer by high-frequency and thereafter pressing the layer into boards with the use of contact heat that produces a steam blast that is effective from the outside of the layer toward the inside, characterized in that the layer is provided initially with the same amount of moisture throughout, which amount is sufficient to produce, by means of and during the high-frequency preheating step, a steam blast which proceeds from the inside of the layer into the surface zone thereof.

2. Process according to claim 1, wherein said particles comprise lignocellulose.

3. Process according to claim 1 or 2, wherein said particles comprise cellulose.

4. Process according to claim 1, characterized in that all particles of the layer are brought, in dependence on the thickness of the boards to be produced, to a total moisture content of up to approximately 20% and thereabove prior to preheating and pressing.

5. Process according to claim 1 or 4, characterized in that the combining step comprises spraying all binder-containing particles with the required amount of water while they are fed to a spreading device or the like.

6. Process according to claim 1 or 4, characterized in that the combining step comprises adding said water to a binder bath with other components thereof during a mixing step.

7. Process according to claims 1 or 4, characterized in that at least one prepressing of the layer is conducted prior to the high-frequency preheating step.

8. Process according to claim 7, characterized in that the temperature is increased up to about 200° C. and thereabove after prepressing during a finishing pressing step.

9. Process according to claim 7, wherein at least one prepressing of the layer is conducted during the high-frequency preheating step.

10. Process according to claim 1 or 4, wherein at least one prepressing of the layer is conducted during the high-frequency preheating step.

11. Process according to claim 10, characterized in that the temperature is increased up to about 200° C. and thereabove after prepressing during a finishing pressing step.

12. Process according to claim 1, wherein said pressing is performed in a continuously operating single-platen system.

13. Process according to claim 1, wherein said pressing is performed in a discontinuously operating single-platen system.

14. Process according to claim 1, wherein said pressing is performed in a continuously operating multiple-platen system.

15. Process according to claim 1, wherein said pressing is performed in a discontinuously operating multiple-platen system.

* * * * *